Dec. 20, 1955 H. L. COOKE 2,727,946

PULSE MULTIPLEX TRANSMITTER SYSTEM

Filed Dec. 11, 1952 2 Sheets-Sheet 1

INVENTOR.
HARRY L. COOKE

BY Charles H. Brown

ATTORNEY

Dec. 20, 1955 H. L. COOKE 2,727,946

PULSE MULTIPLEX TRANSMITTER SYSTEM

Filed Dec. 11, 1952 2 Sheets-Sheet 2

INVENTOR.
HARRY L. COOKE

BY Charles H. Brown
ATTORNEY

United States Patent Office 2,727,946

Patented Dec. 20, 1955

2,727,946

PULSE MULTIPLEX TRANSMITTER SYSTEM

Harry L. Cooke, Port Jefferson, N. Y., assignor to Radio Corporation of America, a corporation of Delaware Application December 11, 1952, Serial No. 325,329

2 Claims. (Cl. 179—15)

This invention relates to a multiplex or multi-channel system operating on the time division principle, and more partcularly, to the transmitting portion of such a system.

In a time division multiplex transmitter, the modulating signals from a number of separate audio inputs are combined into a complex pulse type wave sometimes called a pulse train or video frequency wave. One frame or cycle of operation includes one modulated pulse from each message channel and a synchronizing pulse or pulses. The pulse train wave is used to modulate a radio frequency carrier wave which is radiated from a suitable antenna. Remotely located receiving equipment demodulates the radio frequency carrier wave, to reproduce the pulse train wave, and separates the pulses into message output waves corresponding with the separate audio inputs at the transmitting point. A complete multiplex system of the type under discussion is described in Patent No. 2,543,738 issued to W. D. Houghton on February 27, 1951, and assigned to the assignee of this application.

In the transmitting equipment, the message channels are allotted equal periods of time during each frame or cycle of the pulse train wave. If each channel is allotted a time period of five microseconds and there are 24 channels including synchronizing channels, the period of one cycle of the pulse train is 120 microseconds. A 200-kilocycle crystal master oscillator has a period of five microseconds and a pulse generator responsive to the oscillator generates one pulse every five microseconds. These pulses are applied to step wave generator counter circuits. Different channel units have different audio message signals supplied thereto and are sequentially operated by the outputs of the step wave counter circuits. In the channel units, each message signal is sampled during each frame or cycle of a pulse train wave and a modulated pulse results from the sampling process. The output pulses from the channel units, corresponding to all the message signals, are non-overlapping and are combined into a pulse train and amplified in a bank amplifier.

The pulse train so created by the combination of many separate message pulses which have passed through separate circuits is such that there are slight differences in the widths of the individual pulses, the slopes of the leading and trailing edges, and the spacings of the successive pulses. These variations are due to slight differences in circuit components and to the practical difficulty of adjusting a plurality of circuits to perform in a precisely identical manner. While the variations under discussion might normally be inconsequential, in a time division multiplex system they tend to cause serious interference between channels (known as cross-talk), noise, and distortion of the message signals. To overcome these difficulties, equally spaced central portions of all the message pulses in the pulse train according to the present invention, are selected by a common gate wave and the resulting pulse train is amplified, filtered and employed to modulate a radio frequency carrier wave.

The common gate wave must be very accurately related in time with the output of the pulse generator operated from the master oscillator. The common gate wave must also be delayed relative to the output of the pulse generator by an amount equal to the delay introduced by the step counters and channel units, and by an additional amount sufficient to insure that only the center portions of the message pulses will be gated.

It is an object of this invention to provide an improved time division multiplex transmitter producing a composite pulse train wave of uniformly spaced individual message pulses having a uniform width.

It is another object to provide an improved time division multiplex transmitter wherein noise, distortion and interference between message channels are minimized.

It is a further object to provide a time division multiplex transmitter wherein a common gate wave is generated which has accurately shaped pulses accurately timed relative to each other and to a pulse train wave.

One feature of the invention is means to generate a common gate wave synchronized with but delayed relative to the master oscillator wave. A pulse generator, operated from the master oscillator, supplies pulses to a sawtooth wave generator. The sawtooth wave generator is synchronized with the pulses applied thereto and its output is applied to a timer circuit biased to conduct whenever the instantaneous amplitude of the sawtooth wave reaches a predetermined value. The square wave output of the timer circuit is applied to a gate generator circuit wherein the leading and trailing edges of the square wave shock excite a resonant circuit into oscillation. Excursions of one polarity are short-circuited by a damping diode, and excursions of the other polarity are limited by a clipping diode circuit to a predetermined value. The resultant limited pulses are accurately determined in width by the values of capacitance and inductance in the resonant circuit. The pulses are delayed relative to the output wave from the master oscillator by an amount determined by the timer circuit. The pulse wave is used as a common gate wave to gate an amplifier receptive to a pulse train including message pulses from all channels. The output of the gated amplifier is a pulse train wherein the individual message pulses are of uniform width and are equally spaced apart.

Other objects, aspects and features of the invention will be apparent to those skilled in the art from the following description taken in conjunction with the appended drawings wherein.

Figure 1:
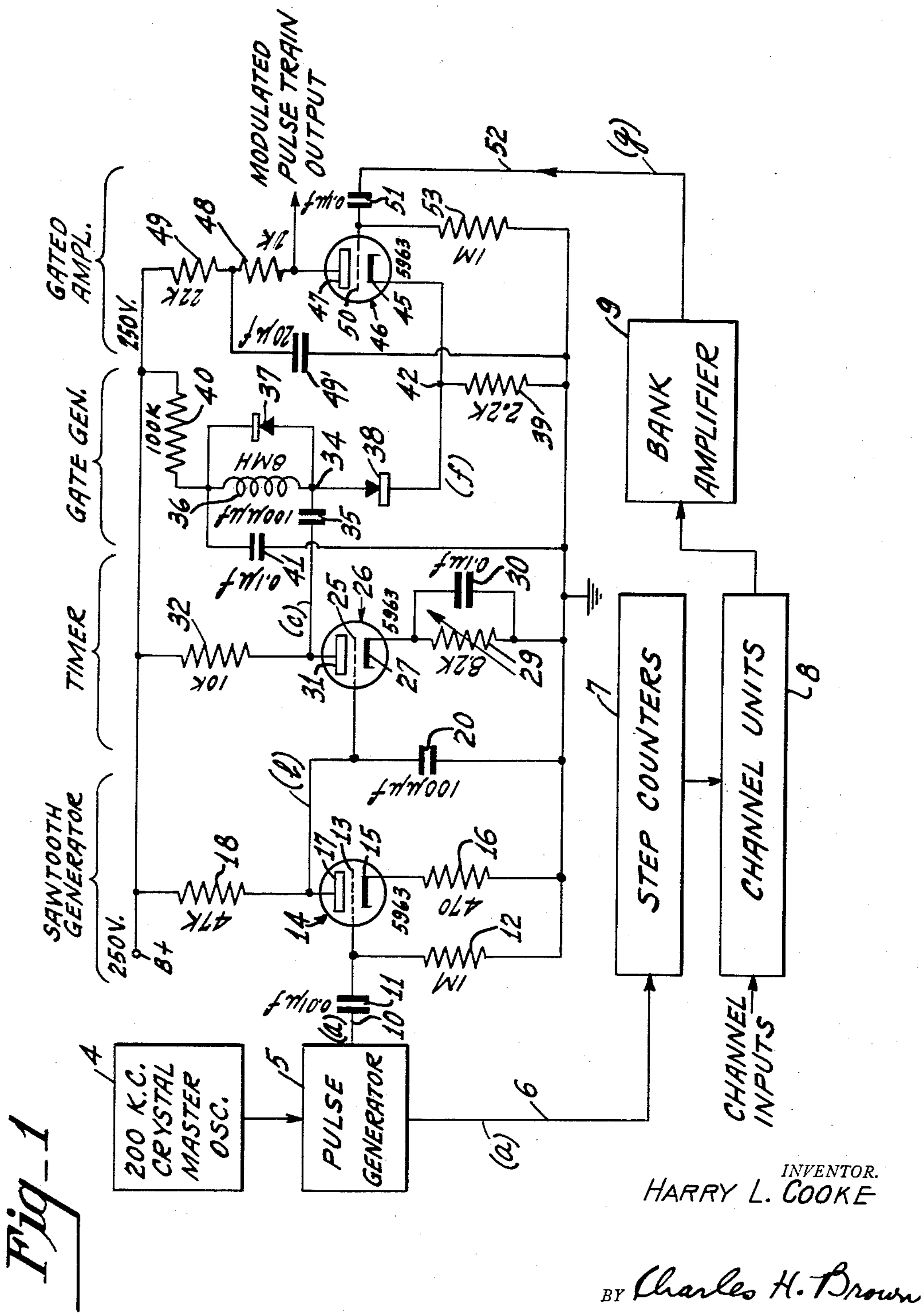
Fig. 1 illustrates, in part diagrammatically and in part schematically, a time division multiplex transmitting equipment constructed according to the teachings of the invention.
Figure 2:
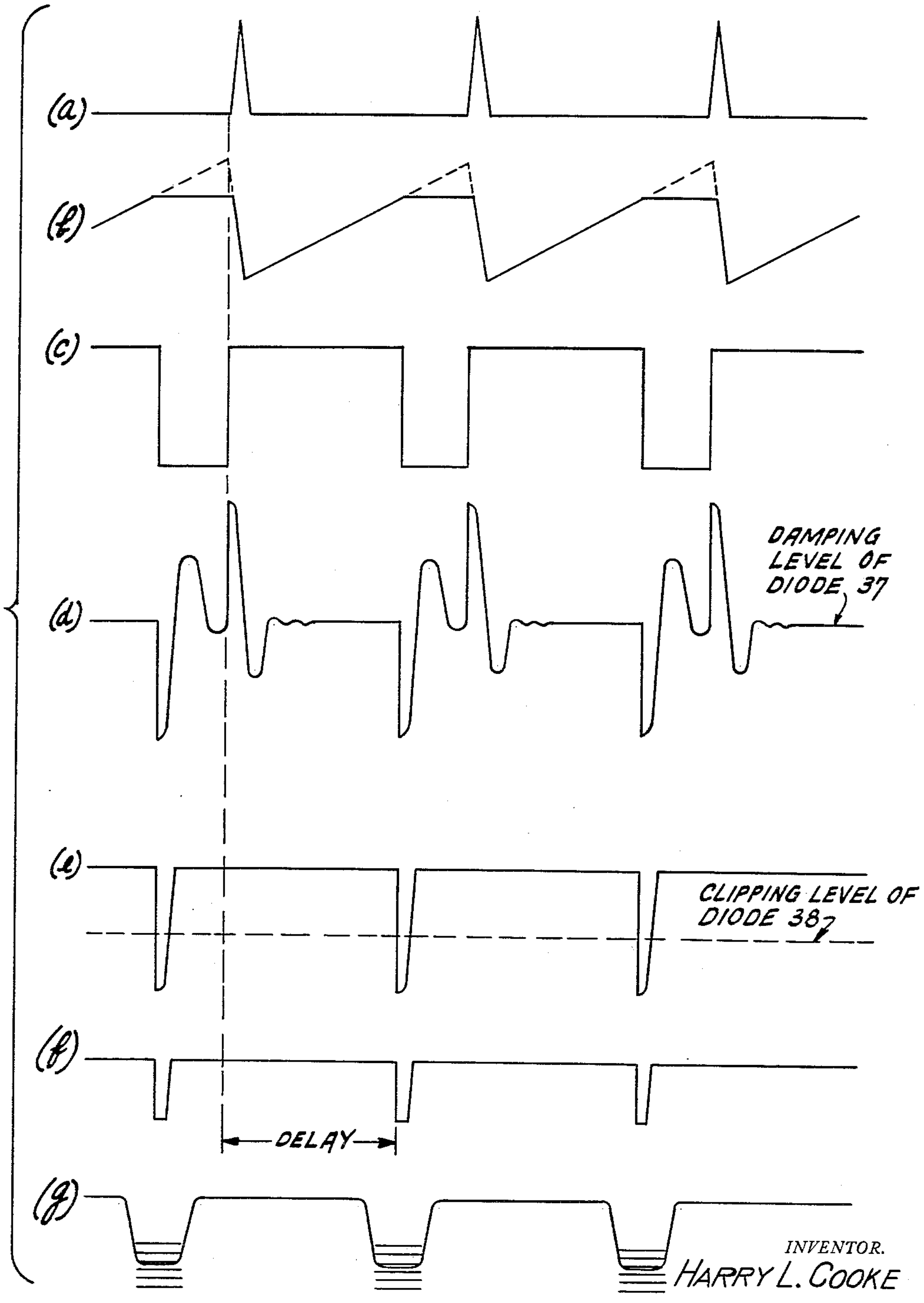
Fig. 2 shows a series of waveforms graphically illustrating the voltage waveforms existing at designated points in the circuit of Fig. 1.

Referring to Fig. 1, a master oscillator 4 oscillates at a frequency which corresponds with the output pulse repetition rate of the pulse multiplex system. If it is desired to allot five microseconds to each channel, oscillator 4 will have a frequency of 200 kilocycles. The output of master oscillator 4 is applied to pulse generator 5 which generates a wave of narrow pulses (curve *a* of Fig. 2) having a repetion rate corresponding with the frequency of oscillator 4. The reference letters *a* to *g* appearing in Fig. 1 indicate the locations at which appear the voltage variations of the waves correspondingly lettered in Fig. 2. One output of pulse generator 5 is applied through lead 6 to step wave counter circuits 7. Channel units 8 are biased to become sequentially operative in response to step waves from counter circuits 7. Different audio channel inputs which may be twenty-two in number are applied to different channel units. The channel units 8 comprise vacuum tubes which are differently biased to become conductive on different risers of the step wave which is applied in common to the channel units. The output of the channel units 8 is a composite pulse train wave wherein successive pulses are samples in sequence of the several audio channel inputs. Each frame or cycle of operation includes one sample of each audio input signal. The pulse train output of channel units 8 is amplified in a bank amplifier 9. The manner in which the step counter circuits 7 and channel units 8 per se operate form no part of the present invention and reference is made to U. S. Patent No. 2,543,738 supra, for a more detailed description thereof.

The pulse train wave from bank amplifier 9 is made up of individual pulses which have been timed by separate step risers in the step counter circuits 7 and have passed through separate circuits in the channel units 8. As a result, the individual pulses vary somewhat in width, slopes of leading and trailing edges and in spacing relative to each other. These variations are eliminated, in accordance with the invention, by gating the pulse train wave with a common gate wave which is generated as follows:

A second output of pulse generator 5 is applied over lead 10 through a coupling capactor 11, across a grid biasing resistor 12, to the grid 13 of a vacuum tube 14 forming part of a sawtooth generator. Cathode 15 of tube 14 is returned to ground through a current limiting resistor 16 which limits the current drawn by the tube in the absence of pulses from source 10. The anode 17 of tube 14 is connected through an anode resistor 18 to a positive terminal B+ of a source of unidirectional voltage. Anode 17 is also connected to ground through storage capacitor 20.

The circuit thus far described constitutes a sawtooth wave generator. The input pulse from pulse generator 5 may be as represented by wave *a* of Fig. 2. The values of grid bias resistor 12 and capacitor 11 are such as to maintain tube 14 in the anode current cut-off condition between input pulses by grid leak bias. Grid leak bias is used so that should the input pulses change in amplitude, the bias will also change in a compensating manner and thus maintain approximately constant anode current during the pulses. This keeps the maximum amplitude of the sawtooth wave at a constant value which will be seen to be important in maintaining a constant time delay between the input and output pulses. Whenever tube 14 is rendered conductive by the presence on grid 13 of a positive input pulse, the potential of anode 17 drops abruptly due to the voltage drop across anode resistor 18 and the discharging of storage condenser 20 through the tube 14. When the tube 14 is cut off by the removal of an input pulse from grid 13, the potential of anode 17 rises towards the B+ value as storage capacitor 20 is charged. The voltage on anode 17 and storage capacitor 20 rises at a rate determined by the time constant of the circuit including storage capacitor 20, anode resistor 18 and the value of the B+ voltage source. The voltage increases towards the B+ value until another input pulse appears on grid 13, at which time tube 14 is rendered conductive and the voltage on anode 17 is again driven down. The output of tube 14 is thus a sawtooth voltage wave having a repetition rate determined by the repetition rate of the input pulses. The sawtooth wave, however, is clipped as shown by wave *b* of Fig. 2 due to the action of the following stage, as will be apparent as the description proceeds.

The sawtooth wave output is applied directly to the grid 25 of a vacuum tube 26 forming part of a timer circuit. The cathode 27 of tube 26 is connected to ground through a variable biasing resistor 29 shunted by a by-pass capacitor 30. The anode 31 of tube 26 is connected through an anode resistor 32 to a positive terminal B+ of the source of unidirectional current.

Tube 26 is normally held in an anode current cut-off condition by the cathode bias developed across variable resistor 29 and capacitor 30. This bias, which determines the value of signal applied to grid 25 at which the tube 26 will conduct, is adjustable by varying the value of resistor 29. The voltage applied to grid 25 is the sawtooth voltage wave generated across storage capacitor 20. When the sawtooth voltage overcomes the bias on tube 26, tube 26 is rendered conductive. This causes a drop in the potential of anode 31 during the time that tube 26 remains conductive. The voltage at the anode 31 is as represented by wave *c* of Fig. 2. When the sawtooth voltage applied to grid 25 overcomes the cut-off bias of tube 26, the grid 25 draws current and produces a voltage drop across resistor 18 which prevents the sawtooth wave from further increasing in amplitude. Therefore, the voltage at anode 17 of generator tube 14 and at grid 25 of timer tube 26 is a clipped sawtooth wave as represented by curve *b* of Fig. 2, the dotted portions indicating how the sawtooth wave would increase in amplitude were it not for the effect of grid current in tube 26.

The square wave output from the anode 31 of tube 26 (wave *c* of Fig. 2) is applied to a gate generator circuit including a capacitor 35, an inductor 36, a damping diode 37, a clipping diode 38 and an output resistor 39. Capacitor 35 is connected through a junction point 34 to one end of inductor 36, the other end of which is connected through a dropping resistor 40 to positive terminal B+ of the source of a unidirectional current. Damping diode 37 is shunted across inductor 36. Clipping diode 38 is connected between junction point 34 and one end of output resistor 39. The other end of resistor 39 is connected to ground. The polarity of diodes 37 and 38 is such that the arrows on the electrodes indicate the direction of possible current flow (as contrasted with electron flow).

The values of capacitor 35 and inductor 36 are selected to provide a series resonant circuit having a frequency such that the time of a quarter cycle therein corresponds with the width desired in the gate pulse. If damping diode 37 were removed and clipping diode 38 were shorted, the square wave applied to series resonant circuit 35, 36 would cause the resonant circuit to ring, i. e., to produce oscillations, and the voltage at point 42 would be as represented by wave *d* of Fig. 2. With damping diode 37 shunted across inductor 36 the oscillations of positive polarity are shorted through the diode 37 so that the voltage wave at point 42 would be as represented by wave *e* of Fig. 2. With clipping diode 38 in place, the peaks of negative excursion are clipped off and the gate wave available for utilization is as represented by curve *f* of Fig. 2.

The gate wave at junction point 42 is applied to the cathode 45 of a gated amplifier vacuum tube 46 having an anode 47 connected through anode resistor 48 and dropping resistor 49 to the positive terminal B+. A by-pass capacitor 49' is connected from the junction between resistors 48 and 49 to ground. Vacuum tube 46 contains a grid 50 which is connected through a coupling capacitor 51 and a lead 52 to the output of bank amplifier 9. A grid biasing resistor 53 is connected between grid 50 and ground. An output is available at the anode 47 of tube 46 which provides amplified portions of the signal applied to grid 50 from bank amplifier 9. The amplified portions correspond in time with the gate pulses applied to the cathode 45.

The operation of the gate generator and the gated amplifier will now be described. The leading and trailing edges of the timer pulse (curve *c* of Fig. 2) applied to the gate generator series resonant circuit, including capacitor 35 and inductor 36, shock excites the circuit into ringing. In the absence of diode 37, the waveform at junction 34 would be as represented by curve *d* of Fig. 2. Damping diode 37 which is shunted across inductor 36 short-circuits the positive swings of the oscillations engendered in resonant circuit 35, 36 so that the resulting voltage gate wave at point 34 is as represented by curve *e* of Fig. 2.

In the interval between the gate pulses, there is a current flowing from the positive terminal B+ through dropping resistor 40, inductor 36, diode 38 and resistor 39 to ground. The voltage drop across resistor 39 biases the cathode 45 of gated amplifier tube 46 sufficiently positive to render tube 46 non-conductive. When a negative gate pulse is applied to point 34, the voltage across resistor 39 drops, because the current therethrough from source terminal B+ is reduced. The voltage at point 42 and at cathode 45 of gated amplifier tube 46 falls to a value such that the tube is rendered conductive. The potential at point 42 is then determined by the value of the current drawn through resistor 39 by tube 46. Since the potential at point 42 at this time (the time during which tube 46 is conductive) is higher (that is, more positive) than the potential at point 34, current cannot flow through diode 38, and tube 46 operates at a class A amplifier for the duration of the peak negative excursion of the gate pulse. During the trailing edge of the negative gate pulse at point 34, diode 38 again starts conducting and the potential at point 42 rises because of current flow over a path including resistor 40, inductor 36, diode 38 and resistor 39, to cause gated amplifier tube 46 to cut off.

The delay between the input pulse (wave *a* of Fig. 2) and the gating pulse (wave *f* of Fig. 2) which gates the amplifier tube 46 is determined by the variable bias resistor 29 in the timer circuit. Resistor 29 is readily adjustable to select the voltage level on the sawtooth wave which will render timer tube 26 conductive and which will thereby provide the desired amount of delay between the input pulse and the gated output of amplifier tube 46. The width of the gate pulse is accurately determined as a quarter of a wavelength at the series resonant frequency of capacitor 35 and inductor 36.

Step wave counter circuits 7, channel units 8 and bank amplifier 9 constitute a generator of a pulse train wave wherein the successive pulses in a frame are amplitude modulated by different message signals. This pulse train wave is represented by wave *g* of Fig. 2, wherein it will be noted that each pulse is delayed relative to the corresponding pulse (wave *a* of Fig. 2) from the pulse generator 5. The delay is inherent in the operation of the step counters 7 and channel units 8. There is also some variation in the widths of the successive pulses (wave *g* of Fig. 2) and in the spacing of each pulse relative to the preceding and following pulses. These variations are eliminated by the action of the gate wave (wave *f* of Fig. 2) which is applied to the cathode 45 of gated amplifier tube 46. The gate wave causes gated amplifier tube 46 to amplify only the central portions of the pulses of the modulated pulse wave train. The gate wave pulses are delayed relative to the pulses from pulse generator 5 by the proper amount to select the central portions of the modulated pulses, and the central portions selected are made to be of exactly the same width by the operation of the gate generator including capacitor 35 and inductor 36. The central portions selected are also exactly equally spaced because the gate wave is derived from pulse generator 5 which is controlled by crystal master oscillator 4. It is apparent that the gated pulse train wave from the anode 47 of gated amplifier tube 46 consists of modulated pulses which have uniform width, similar slopes of the edges, and uniform spacing. As a result, the multiplex system is free of the interference between channels, the noise and the distortion of message signals which would otherwise be present.

A system as shown in Fig. 1 was constructed using the values of circuit elements shown in the drawing. Five microseconds was allotted to each message channel so the master oscillator 4 had a frequency of 200 kilocycles and the pulses (wave *a* of Fig. 2) from pulse generator 5 were spaced five microseconds apart. The centers of the modulated pulses (wave *g* of Fig. 2) from bank amplifier 9 were delayed relative to the pulses from pulse generator 5 by about 1.7 microseconds. The gate pulses (wave *f* of Fig. 2) were delayed relative to the pulses from pulse generator 5 by this same amount of 1.7 microseconds. The modulated pulse train wave from anode 47 of gated amplifier tube 46 was passed through amplifiers and a low-pass filter and then employed to modulate a radio-frequency carrier wave. There was no interference, noise or distortion in the system due to variations in the widths, shapes spacings of the message pulses in the pulse train wave.

What is claimed is:

1. A pulse multiplex transmitter system comprising, a master oscillator, a pulse generator coupled to said oscillator to generate one pulse for every cycle of said oscillator, a pulse train wave generator controlled by said pulse generator and operative to generate a pulse train wave wherein successive pulses are modulated by different message signals, a sawtooth wave generator, means to synchronize said sawtooth wave generator with the output of said pulse generator, a first electron discharge device having an input coupled to the output of said sawtooth wave generator, means to bias said device to be conductive during the time said sawtooth wave exceeds a predetermined voltage, a resonant circuit coupled to the output of said first discharge device to be shock excited by transitions between the conductive and nonconductive states of said first device, a first diode connected across at least a portion of said resonant circuit to short circuit oscillation swings of one polarity, a second diode and an impedance connected in series from said resonant circuit to a point of reference potential, a second electron discharge device having cathode, grid and plate electrodes, a connection from the junction of said second diode and said impedance to said cathode, and means coupling the output of said pulse train wave generator to said grid, whereby a uniformly gated pulse train wave is obtained from said plate electrode.

2. A pulse multiplex transmitter system comprising, a master oscillator, a pulse generator coupled to said oscillator to generate one pulse for every cycle of said oscillator, a pulse train wave generator controlled by said pulse generator and operative to generate a pulse train wave wherein successive pulses are modulated by different message signals, a sawtooth wave generator, means to synchronize said sawtooth wave generator with the output of said pulse generator, a first electron discharge device having an input coupled to the output of said sawtooth wave generator, means to bias said device to be conductive during the time said sawtooth wave exceeds a predetermined voltage, a resonant circuit coupled to the output of said first discharge device to be shock excited by transitions between the conductive and nonconductive states of said first device, a first diode connected across at least a portion of said resonant circuit to short circuit oscillation swings of one polarity, a second diode and an impedance connected in series from said resonant circuit to a point of reference potential, a second electron discharge device having first, second and third electrodes, a connection from the junction of said second diode and said impedance to said first electrode, and means coupling the output of said pulse train wave generator to said second electrode, whereby a uniformly gated pulse train wave is obtained from said third electrode.

No references cited.